United States Patent [19]

Spangler et al.

[11] Patent Number: 5,217,110

[45] Date of Patent: Jun. 8, 1993

[54] MODULAR PLASTIC TURN BELT CONVEYOR SYSTEM, MODULE, BELT AND DRIVE THEREFOR

[75] Inventors: Michael L. Spangler, Cambridge; Thomas O. Perdue, Salisbury, both of Md.

[73] Assignee: Cambridge Wire Cloth Company, Cambridge, Md.

[21] Appl. No.: 872,524

[22] Filed: Apr. 23, 1992

[51] Int. Cl.⁵ .............................................. B65G 17/06
[52] U.S. Cl. ..................................... 198/852; 198/853
[58] Field of Search ................ 198/850, 851, 852, 853

[56] References Cited

U.S. PATENT DOCUMENTS

| | | | |
|---|---|---|---|
| 3,726,569 | 4/1973 | Maglio et al. | 198/853 |
| 3,870,141 | 3/1975 | Lapeyre et al. | 198/853 |
| 3,939,964 | 2/1976 | Poerink | 198/853 |
| 4,469,221 | 9/1984 | Albert | 198/851 |
| 4,709,807 | 12/1987 | Poerink | 198/851 X |
| 4,832,187 | 5/1989 | Lapeyre | 198/851 |
| 4,893,710 | 1/1990 | Bailey et al. | 198/853 |
| 4,953,693 | 9/1990 | Draebel | 198/851 X |
| 5,000,312 | 3/1991 | Damkjaer | 198/853 |
| 5,024,321 | 6/1991 | Lapeyre | 198/853 |
| 5,058,732 | 10/1991 | Lapeyre | 198/852 |
| 5,096,053 | 3/1992 | Hodlewsky | 198/853 |
| 5,105,938 | 4/1992 | Tan | 198/851 X |

FOREIGN PATENT DOCUMENTS

| | | |
|---|---|---|
| 113669 | 10/1900 | Fed. Rep. of Germany . |
| 3505013 | 8/1986 | Fed. Rep. of Germany ...... 198/853 |

Primary Examiner—Robert P. Olszewski
Assistant Examiner—James R. Bidwell
Attorney, Agent, or Firm—Rothwell, Figg, Ernst & Kurz

[57] ABSTRACT

A modular plastic conveyor belt with a plurality of modules with interfitting link ends, connected by pivot rods has a rod-retention system with a slidable pivot rod hole blocking member which is inserted from the bottom of the outermost link end of an edge module and is captured in the edge module after insertion while being slidable to blocking and nonblocking positions. The modules are constructed with wide link ends for driving and narrow link ends to create multiple shear planes on one side and constant width link ends on the other side of the module, the constant width link ends being spaced to accommodate the wide and narrow link ends and there being a connecting structure between the link ends for stiffening.

11 Claims, 4 Drawing Sheets

MODULAR PLASTIC TURN BELT CONVEYOR SYSTEM, MODULE, BELT AND DRIVE THEREFOR

BACKGROUND OF THE INVENTION

1. Field of the Invention

This invention relates to improvements in modular plastic conveyor belts and modules therefore. In particular, this invention concerns a unique pivot rod retention arrangement and unique link end shapes and stiffening construction for the individual modules of the belt.

2. Prior Art

The basic concept of modular conveyor belts in which there are a plurality of modules having interfitting link ends which are held together by pivot rods extending through holes in the link ends has been known since the nineteenth century as shown by the German Patent No. 113,619, Mallard, 1899.

In the 1970's, various modular conveyor belts were molded of plastic and included arrangements for stiffening the modules intermediate the link ends. See for example, U.S. Pat. No., 3,870,141, Lapeyre, et. al., 1975.

The retention of the pivot is an important feature of the modular plastic conveyor belts. Rod retention can be accomplished by enlarging the heads of the pivot rods but such would not allow for disassembly without destroying the rod head. It is important to be able to remove the pivot rods from the assembled plastic conveyor belt while the conveyor belt is installed on location for repairs as may be required. Therefore, it is important to have a rod-retention arrangement which will allow for easy removal of the pivot rod for reassembly but will retain the rod in position during operation. U.S. Pat. No. 3,939,964, Poerink, 1976 shows one such rod retention arrangement in which pins are inserted into transverse bores which intersect the pivot rod holes outside the ends of the pivot rods, i.e. the bores and pins are in the outermost link end of the end modules. This has an advantage of not positively interlocking with the pivot rods as the pivot rods may expand or contract at different rates than the remainder of the assembly.

A similar approach to rod retention is shown in U.S. Pat. No. 5,024,321, Lapeyre, 1991. In this patent a module has a slot extending completely through a thickened outermost link end for the insertion of a bifurcated retaining pin which, when inserted blocks the pivot pin hole. However, the pin must be inserted from the top surface of the conveyor and for removal a screwdriver or similar instrument must be used to push the pin out from the top or bottom of the conveyor. Thus, access must be had to both the top and bottom of the outermost conveyor belt link in order to remove the pin and hence remove the rod.

A further approach to rod retention is shown in U.S. Pat. No. 4,893,710, Bailey et al., 1990, wherein a blocking member of a unique molded shape fits in a complementary shaped slot. The blocking member is also flush with the top of the conveyor. While this construction is quite successful, it does have a disadvantage in that the blocking members (similar to the pins of the prior art mentioned above) are small and can easily be lost or misplaced. Furthermore (similar to the other prior art mentioned above) the blocking members must be removed via access from the top and bottom surfaces of the conveyor belt.

Another approach to rod retention is disclosed in U.S. Pat. No. 5,000,312, Damkjaer, 1991. In this patent the links or modules are not bricklayed, but instead are assembled so that chains of identical modules are side by side. The outer link ends of all modules are thicker than the others to accommodate locking dowels which may be inserted into a notch. These locking dowels have the same disadvantages of being easily lost or misplaced and having to be inserted inconveniently.

Because all of the blocking of exclusive movement of pivot rods by pins, dowels, abutments, blocking members or the like of the prior art are loose and can be removed, a problem is created when repairs are required in the field. If a pivot rod blocking member is removed and misplaced or lost then time for repairs will be lost. Furthermore, in the prior art, in order to remove the pivot rod, the blocking member itself must be removed and access must be had to the top and bottom of the conveyor belt edges in order to remove the blocking member. Thus, there is a need in the art for a blocking member which is captured i the module end link and which can be moved to and from blocking position, i.e. one position to block the movement of the pivot rod out of the hole and the another position to unblock the pivot rod hole to allow removal of the pivot rod for repair or disassembly.

There if also need in the prior art for conveyor modules in which there are relatively wide link ends to accommodate the teeth of a driving sprocket and relatively narrow link ends to provide as many pivot rod shear planes as possible in the same module. This obviously involves link ends of varying widths. And while link ends of varying widths have been known in the art, see e.g. U.S. Pat. No. 3,726,569, Maglio, 1973, U.S. Pat. No. 4,893,710 and German Patent 113,669 mentioned above, none are directed to driving at the link end via a wide link end and providing a plurality of narrow link ends for increased pivot rod shear planes.

SUMMARY OF THE INVENTION

This invention provides a modular plastic conveyor belt of the type having a plurality of modules each with interfitting link ends and a pivot hole in each link end, the link ends being on opposite sides of the modules and pivot rods extending across the belt through the pivot holes to pivotly connect the interfitting link ends of the modules in adjacent rows, the conveyor belt having a unique rod-retention system and unique modular construction. The rod-retention system is encompassed in the outermost link end of the edge modules and has a blocking member which is captured within the link end and is movable to block or clear the pivot rod hole. The slidable pivot rod blocking member is inserted into an opening from the bottom surface of the outermost link end. The opening extends length-wise of the link end and is configured to receive the blocking member so that it can only be inserted correctly. The opening extends to the pivot rod hole. The blocking member is of a configuration that causes it to be captured when inserted but allows it to be slidable from a blocking position to an unblocking position length-wise of the line end. The link end has an access opening in the outer side edge thereof to allow access to the sliding blocking member for moving it from blocking position to unblocking position. When in unblocking position, the pivot rod hole is clear so that the pivot rod may be removed for various reasons as is known in the art while the blocking member is captured and therefore can never be lost.

Additionally, the modules have some wide link ends on one side interspersed with narrow link ends. The wide link ends being for driving contact with the sprocket teeth and the narrow link ends providing additional shear planes at the pivot rod. The other side of each module has equal length link ends but such are not all equally spaced from each other to allow interfitting with the narrow and wide link ends on the opposite side of an adjacent module. In order to provide stiffness for the module between the link ends, there is a box-like connection structure between a group of the constant width link ends on one side of the module and the narrow link ends and adjacent wide link ends on the other side of the module.

DETAILED DESCRIPTION OF THE PREFERRED EMBODIMENTS

Figure 1:
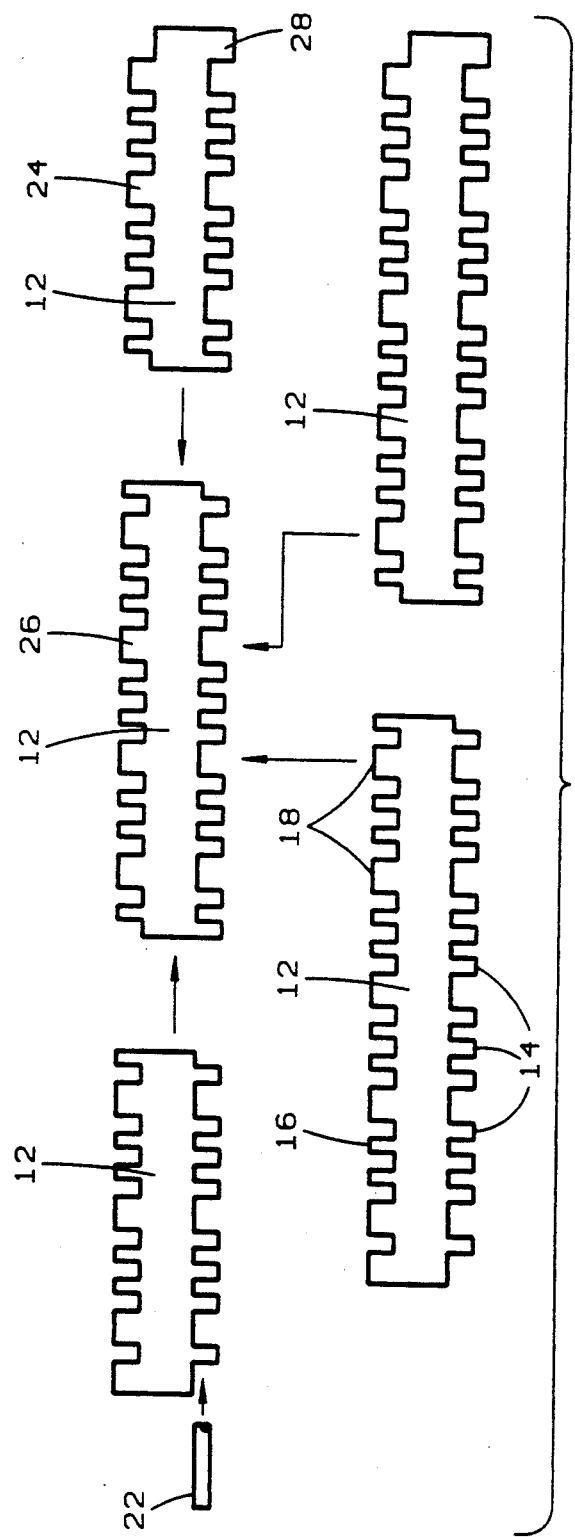
FIG. 1 is an exploded assembly view of a solid top belt of this invention.
Figure 2:
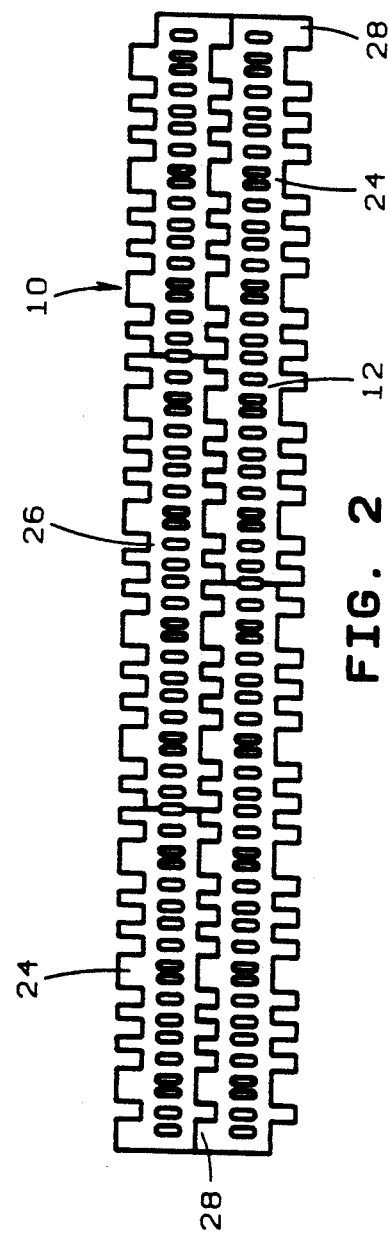
FIG. 2 is a top plan assembly view of a perforated top belt of this invention.

As shown in FIGS. 1 or 2, a modular plastic conveyor belt 10 is comprised of a plurality of plastic modules 12. In this invention there may be four or five different modules which are assembled together to make the belt. A large left edge module, a large right edge module, a small right edge module, a small left edge module and an intermediate module. Such five-module belts are known, for example in German Patent 113,669 and U.S. Pat. No. 4,893,710. In the FIG. 1 embodiment the tops of the modules are solid while in the FIG. 2 embodiment the tops of the module are perforated.

Each module has a plurality of link ends on both sides thereof. On one side there are a plurality of link ends 14, each of the same width. However, these link ends are spaced in groups in which the spacing between the link ends is set to accommodate wider and narrower link ends on an adjacent module. The other side of the module 12 has a plurality of narrow link ends 16 interspersed with wide link ends 18. The wide link ends allow contact at surface 19 with the drive teeth of a sprocket drive (not shown) across a relatively wide width whereas the narrow link ends 16 provide multiple shear planes to provide for additional shear strength at the pivot rod.

Each of the link ends has a pivot rod hole 20 for accommodating a pivot rod 22.

As shown in FIG. 1 or 2, there are end modules 24, which may be four different types as described above, and intermediate modules 26. The number of intermediate modules used determines the width of the conveyor belt. Conveyor belts of this invention are commonly made to order and hence are of custom size and can be assembled to any size consistent with the size of the modules.

Each end module 24 has a wide outermost link end 28 into which a blocking member 30 may be inserted, captured therein after insertion for either blocking or opening the pivot rod hole 20 in the outermost link end 28.

Figure 3:
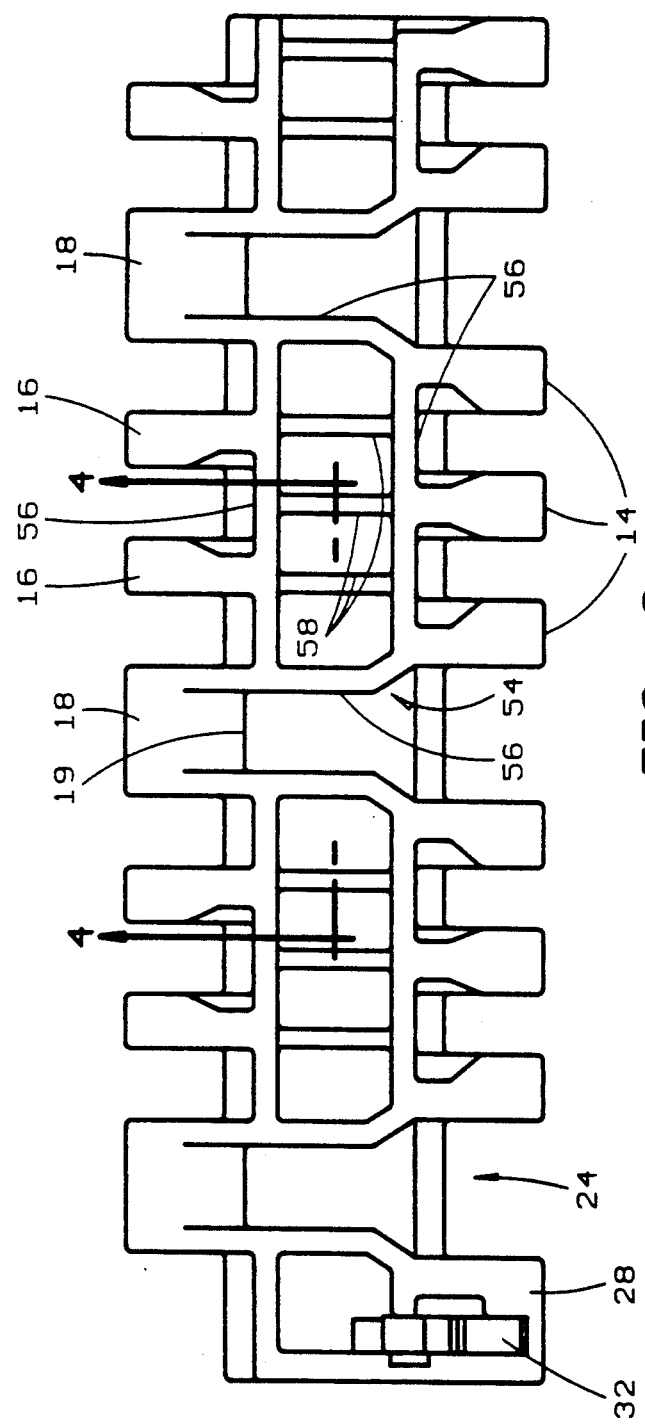
FIG. 3 is a bottom plan view of an end module.
Figure 5:
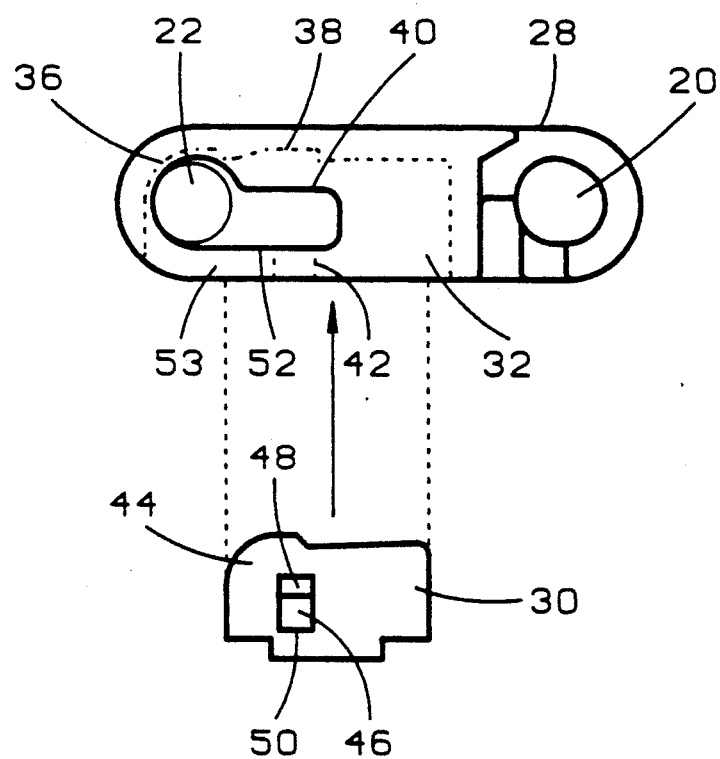
FIG. 5 is a side elevation view of a side edge of the endmost link end and the blocking member showing insertion of the blocking member.
Figure 6:
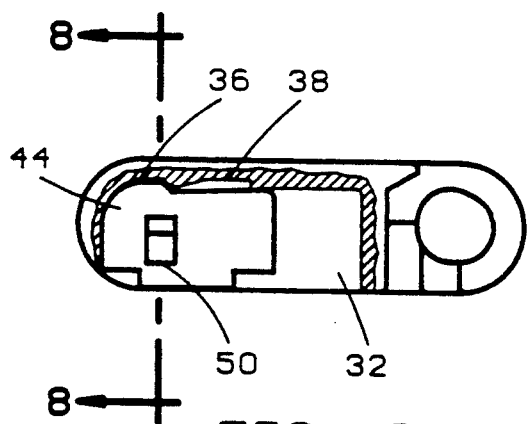
FIG. 6 is a cutaway part sectional side elevation of the endmost link end with the blocking member in pivot rod link blocking position.

In order to insert the blocking member 30, there is a means defining a bottom opening 32 extending from the bottom into the inside of the outermost link end 28, see FIG. 3, 5 and 6. This opening 32 is long enough so that the blocking member can be inserted. The opening 32 accommodates sliding of the blocking member 30 to and from a blocking position. A curved forward roof 36 of the opening is provided for holding the blocking member in closed position. An indentation 38 in the roof of the opening is for holding the blocking member in open position.

Figure 8:
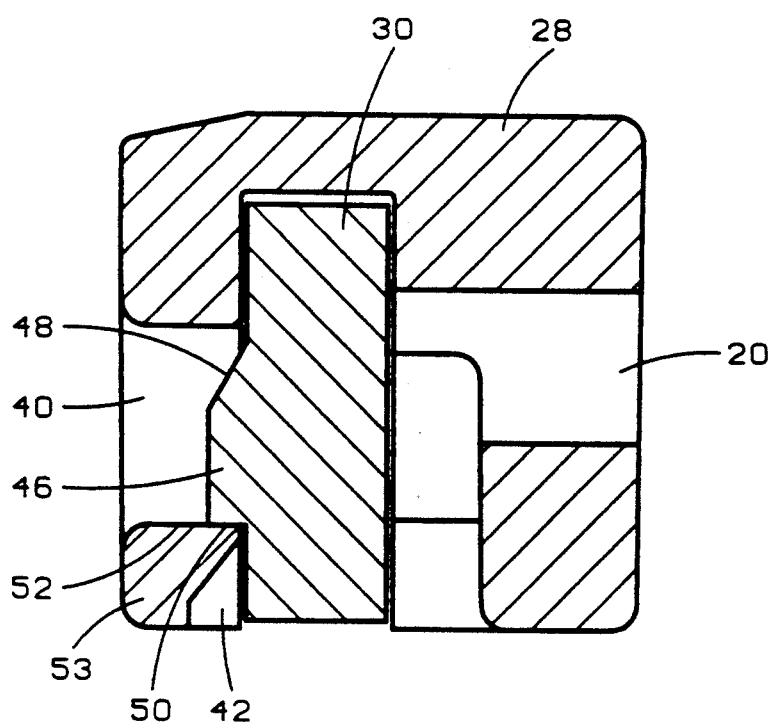
FIG. 8 is a sectional elevation taken on line 8—8 of FIG. 6 and showing the blocking member captured in the endmost link end.

There is also provided an access opening 40 in the outer side edge of the end module link end 28 see FIGS. 5 and 8 in order to have access to the blocking member to slide it from one position to another.

To assure that the blocking member is insertable in its correct position, there is a slot 42 in the side surface of the bottom opening leading to the access opening, see FIGS. 5 and 8.

An abutment 46 projecting from one side edge of the blocking member cooperates with the slot 42 for insertion of the blocking member. In order to assist with insertion, the abutment has a ramp 48 on the top-most side. In order to retain the blocking member after insertion, there is a retaining surface 50 on the abutment for capturing the blocking member. The surface 50 rides on a bottom surface 52 of the access opening 40.

Figure 7:
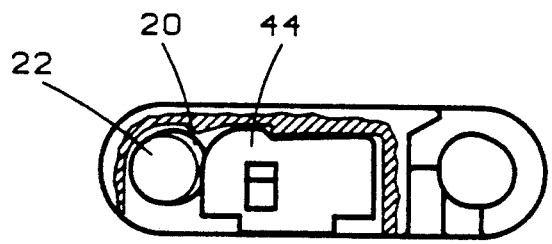
FIG. 7 is a view similar to FIG. 6 but with the blocking member in unblocking position.

A rounded head 44 on blocking member 30 cooperates with the curved roof 36 of the opening when the blocking member is in closed position and with the indentation 38 in the roof when the blocking member is in open position, see FIGS. 6 and 7.

Figure 4:
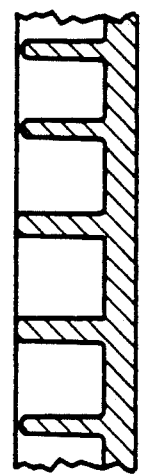
FIG. 4 is a sectional elevation view taken along line 4—4 of FIG. 3.

As shown in FIG. 3, in order to provide stiffness for the individual modules, there is a connecting structure 54 which includes box-like elements 56 linking one edge of the wide links and the intermediate links with adjacent constant width links on the opposite sides of the module and interspersed with connecting ribs 58 which are recessed from the surface of the box elements (see FIG. 4) in order to decrease the possibility of wearing grooves in a conveyor belt support surface. As can be seen, the constant width links are spaced in groups of three in which the spaces between them accommodate the narrow width link ends on the opposite side of an adjacent module and the wide spaces accommodate the wide link ends on the opposite side of adjacent modules. This has the advantage of both providing for wide-module drive, multiple shear planes and a stiff module.

In operation of the pivot rod retention means, when the belt is assembled to custom size with pivot rods, the blocking members 30 are inserted into the outermost link ends 28 by sliding upwards into the bottom opening with the abutment 46 sliding in slot 42 until fully installed with the head 44 in the indentation 38, see FIGS. 5 and 6. The retaining surface 50 cooperating with bottom surface 52 of the access opening 40 captures the blocking member 30 and prevents it from ever coming out of the link end. The blocking member may be slid length-wise of the link end into blocking position after the pivot rod is inserted by contacting the abutment 46 from the outer side edge of the link end 28 through the access opening 40 by a small screwdriver or similar tool and sliding it toward the pivot hole in order that the head 44 of the blocking member moves to a position in the curved roof 36 where it is retained iva the configuration of the roof until it is desired to open up the pivot rod opening. In order to open the pivot rod opening for access to the pivot rod, a small tool or the like is used to slide the blocking member 30 to the nonblocking position as shown in FIG. 7. Bottom member 53 of access opening 40 is dimensioned so that it can deform during insertion of the blocking member 30, and while blocking member 30 is moved between the non-blocking and blocking positions. Being of a flexible material, bottom member recovers to its original position after deformation. In this manner, blocking member 30 is permanently captured in opening 32 and there is sufficient force to retain blocking member 30 in the blocking position during normal use while providing the ability to slide the blocking member to the nonblocking position for installation or repair.

As can be seen, this invention provides a unique arrangement for blocking and unblocking a pivot rod in which a blocking member is captured in the outermost link end and cannot be lost. Access may be had to move the blocking member from blocking to unblocking position, via the side of the conveyor which is a considerable advantage because many conveyor belts are repaired while installed, and the top and/or bottom are not available for access to remove a blocking member. Furthermore, the module construction provides for the dual advantages of both a wide tooth drive and multiple rod shear planes wile providing a stiff module. This invention, therefore, is limited only by the scope of the following claims.

What is claimed is:

1. In a modular plastic conveyor belt of the type having a plurality of modules, each with interfitting link ends, each link end having a pivot rod hole, the link ends being on opposite sides of the modules, pivot rods extending across the belt to pivotly connect the interfitting link ends of the modules in adjacent rows, and a rod retention system in the outermost link end of edge modules for blocking movement of the pivot rods when installed, with improvements in the rod retention system comprising:
   (a) a slidable pivot rod blocking member capable of being captured in the outermost link end;
   (b) means defining an opening from a bottom surface of the outermost link end of the edge modules, the opening extending length-wise of the outermost link end for distance sufficient to receive insertion of the blocking member; and
   (c) means for capturing the blocking member in the outermost link end after insertion to prevent the blocking member from being removed while allowing the blocking member to be slidable from blocking to nonblocking position.

2. A modular plastic conveyor belt as defined in claim 1 further comprising an access opening in the outer side surface of the outermost link end for providing access to slide the blocking member between blocking and nonblocking positions from the outer side the belt.

3. A modular plastic conveyor belt as defined in claims 1 or 2 wherein the means for capturing the blocking member comprises an abutment projecting from one side of the blocking member, the abutment having an entrance ramp to allow insertion into the means defining the bottom opening and a retaining surface on the abutment to cooperate with a surface on the access opening to prevent removal of the blocking member after installation.

4. A modular plastic conveyor belt as defined in claim 3 wherein the abutment projects into the access opening when the blocking member is installed in the link end.

5. A modular plastic conveyor belt as defined in claim 3 wherein means defining the bottom opening has a roof configured to cooperate with the top portion of the blocking member in order to define and hold the blocking member in either of two positions, a pivot rod hole blocking position and a pivot rod hole clearing position.

6. A modular plastic conveyor belt as defined in claim 1 wherein the modules are of a configuration comprising link ends of one size and width on one side of the module and link ends of two other sizes and widths on the other side of the module, one of the two other sizes and widths being wider than the link ends of the one size and width and constituting drive links, the other of the two sizes and widths being smaller than the links of the one size and widths on the other side of the module.

7. A modular plastic conveyor belt as defined in claim 6 further comprising a connecting structure between the links to provide stiffness.

8. An end module for a modular plastic conveyor belt, the end module having an outermost link end with an improved rod-retention arrangement comprising:
   (a) pivot rod hole blocking member;
   (b) means defining an opening from the bottom of the outermost link end to the interior thereof for insertion of the blocking member and extending lengthwise to allow the blocking member to slide form a blocking to an unblocking position;
   (c) means capturing the blocking member inside the outermost link end and preventing its removal once the blocking member is inserted;
   (d) means for holding the blocking member in either blocking or nonblocking position;
   (e) means for accessing the blocking member from the outer side edge of the inmost link end to move the blocking member from one position to another.

9. A modular plastic conveyor belt assembled from a plurality of plastic modules, each module having interfitting link ends on opposite sides thereof, and all link ends having pivot rod holes to accommodate a pivot rod, with improvements in each module comprising: the link ends on one side of the module being a single width, the link ends on the other side of the module being of two different widths, namely, wide link ends and narrow link ends, at least some of the narrow link ends being positioned between the wide link ends, and the wide link ends serving as drive links for accommodating teeth of a drive sprocket.

10. A modular plastic conveyor belt as defined in claim 9 further comprising a connecting structure connecting the plurality of single width link ends on one side of the module with the plurality of narrow link ends on the other side of the module and one edge of adjacent spaced wide link ends on the other side of the module to provide stiffening.

11. A modular plastic conveyor belt as defined in claim 10 wherein the connecting structure is a box-like structure with recessed connecting ribs.

* * * * *

UNITED STATES PATENT AND TRADEMARK OFFICE
CERTIFICATE OF CORRECTION

PATENT NO. : 5,217,110
DATED : June 8, 1993
INVENTOR(S) : Spangler et al.

It is certified that error appears in the above-identified patent and that said Letters Patent is hereby corrected as shown below:

Title page, item [54] in the title, delete "TURN".

Col. 1, line 1, in the Title, delete "TURN".

Col. 1, line 25, after "pivot" insert --rod--.

Col. 2, line 21, "i" should be --in--.

Col. 2, line 62, "line" should be --link--.

Col. 5, line 34, "wile" should be --while--.

Col. 6, line 35, "form" should be --from--.

Signed and Sealed this

Seventeenth Day of May, 1994

BRUCE LEHMAN

Attest:

Attesting Officer

Commissioner of Patents and Trademarks